US012632525B1

(12) United States Patent
Klueppel et al.

(10) Patent No.: US 12,632,525 B1
(45) Date of Patent: May 19, 2026

(54) CREDENTIAL ROTATION USING A PROCESS AUTOMATION TOOL

(71) Applicant: THE HUNTINGTON NATIONAL BANK, Columbus, OH (US)

(72) Inventors: David Klueppel, Columbus, OH (US); Deepak Jayan, Columbus, OH (US); Bradley Minch, Columbus, OH (US); Christopher Samson, Columbus, OH (US)

(73) Assignee: The Huntington National Bank, Columbus, OH (US)

( * ) Notice: Subject to any disclaimer, the term of this patent is extended or adjusted under 35 U.S.C. 154(b) by 0 days.

(21) Appl. No.: 19/203,585

(22) Filed: May 9, 2025

(51) Int. Cl.
| | |
|---|---|
| *G06F 21/31* | (2013.01) |
| *G06F 21/60* | (2013.01) |
| *H04L 9/08* | (2006.01) |
| *G06F 21/00* | (2013.01) |
| *G06F 21/62* | (2013.01) |
| *H04L 9/00* | (2022.01) |
| *H04L 9/40* | (2022.01) |

(52) U.S. Cl.
CPC ............ *G06F 21/31* (2013.01); *G06F 21/604* (2013.01); *H04L 9/083* (2013.01); *H04L 9/0891* (2013.01); *G06F 21/60* (2013.01); *G06F 21/62* (2013.01); *H04L 9/40* (2022.05)

(58) Field of Classification Search
CPC .......... G06F 21/31; G06F 21/60; G06F 21/62; G06F 21/604; H04L 9/083; H04L 9/0891; H04L 9/40
See application file for complete search history.

(56) References Cited

U.S. PATENT DOCUMENTS 10,007,779 B1 * 6/2018 McClintock ............ G06F 21/31
12,135,778 B2 * 11/2024 Paslaru ................. G06F 21/335
(Continued)

FOREIGN PATENT DOCUMENTS

WO      WO-2025063962 A1 * 3/2025 ............. H04L 63/00

OTHER PUBLICATIONS

"Robotic Process Automation Security Best Practices: Managing Identities and Privileges"—Morey J. Haber, Beyond Trust, Jun. 12, 2019 https://www.beyondtrust.com/blog/entry/managing-identities-and-privileges-for-robotic-process-automation-rpa (Year: 2019).*
(Continued)

*Primary Examiner* — Randy A Scott
(74) *Attorney, Agent, or Firm* — Kilpatrick Townsend & Stockton LLP

(57) ABSTRACT

Techniques are described herein for rotating a credential using a process automation tool. A first process automation tool can use an application programming interface (API) call to request an updated credential from an external credential manager to replace an existing credential stored in an internal credential storage system. The first process automation tool can obtain the updated credential from an output of the API call. The first process automation tool can access the existing credential and replace the existing credential with the updated credential. Subsequently, a second process automation tool can access the internal credential storage system to obtain the updated credential. The second process automation tool can perform an authentication process to provide access to a protected computing resource.

20 Claims, 6 Drawing Sheets

(56)          References Cited

U.S. PATENT DOCUMENTS

2018/0316676 A1 *  11/2018  Gilpin ................... H04L 9/0891
2022/0269811 A1 *   8/2022  Gummadivalli .......... G06F 9/54

OTHER PUBLICATIONS

"Authentication and Authorization in Robotic Process Automation
(RPA)"—Tolamise Olasehinde, Obafemi Awolowo University, Jul.
14, 2023 https://www.researchgate.net/publication/385586194_
Authentication_and_Authorization_in_Robotic_Process_Automation_
RPA (Year: 2023).*

* cited by examiner

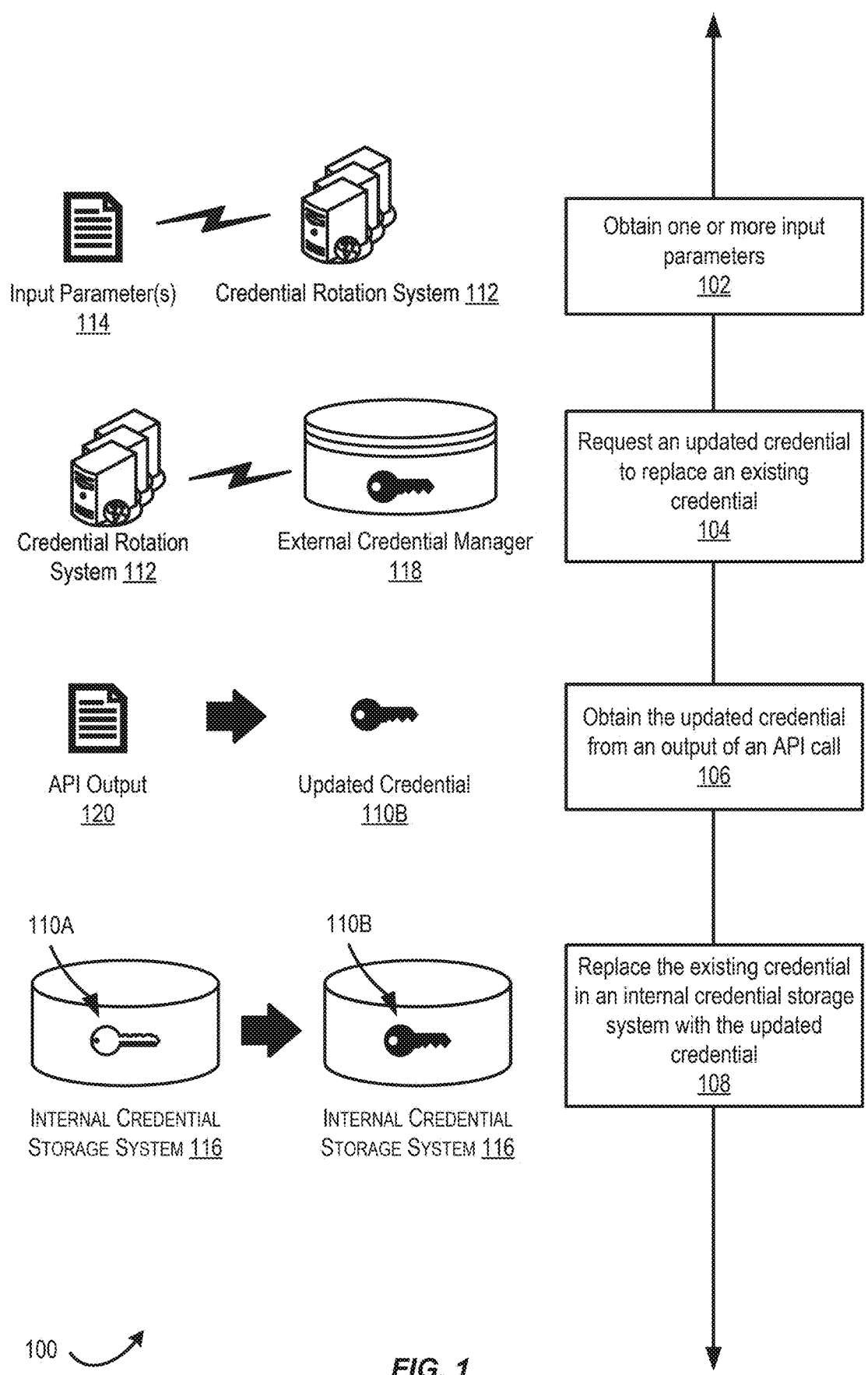

Input Parameter(s)
114

Credential Rotation System 112

Credential Rotation
System 112

External Credential Manager
118

API Output
120

Updated Credential
110B

110A

110B

INTERNAL CREDENTIAL
STORAGE SYSTEM 116

INTERNAL CREDENTIAL
STORAGE SYSTEM 116

Obtain one or more input
parameters
102

Request an updated credential
to replace an existing
credential
104

Obtain the updated credential
from an output of an API call
106

Replace the existing credential
in an internal credential storage
system with the updated
credential
108

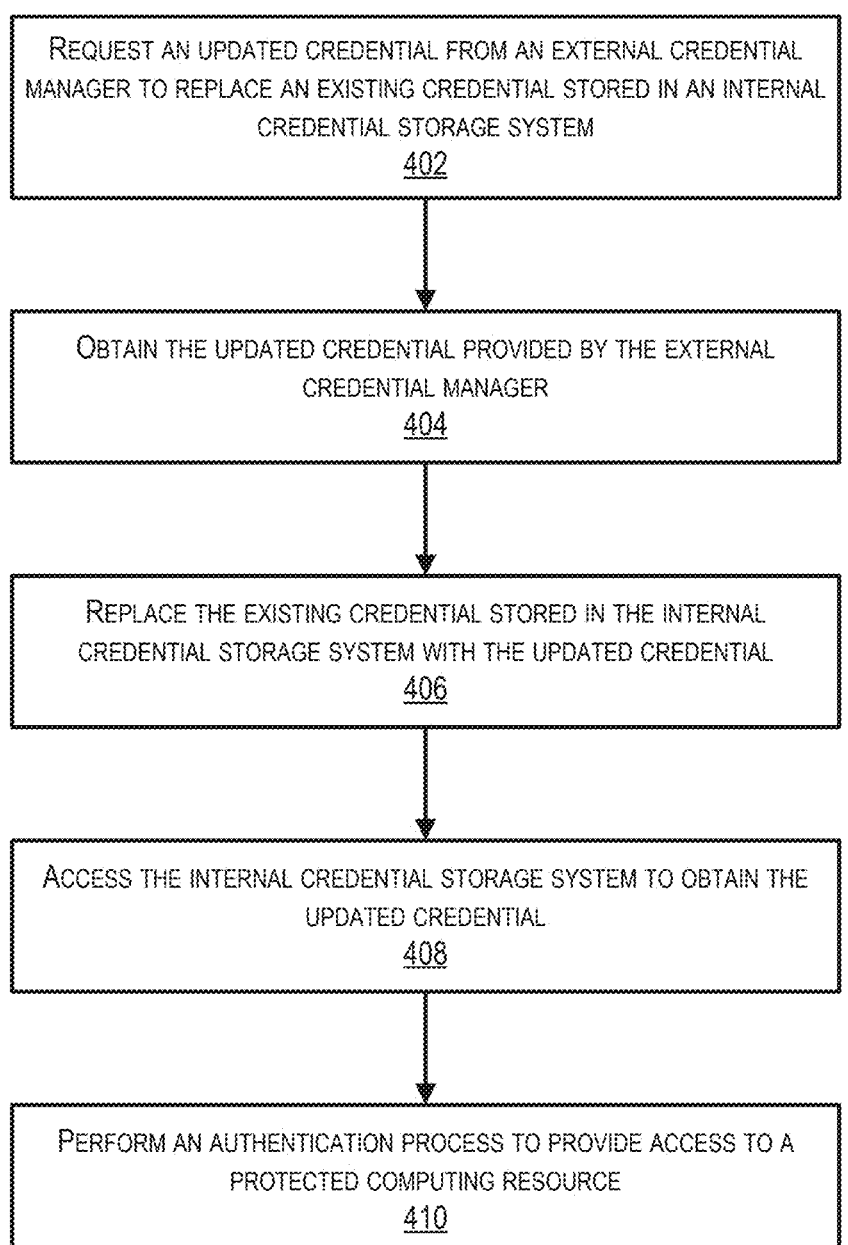

REQUEST AN UPDATED CREDENTIAL FROM AN EXTERNAL CREDENTIAL MANAGER TO REPLACE AN EXISTING CREDENTIAL STORED IN AN INTERNAL CREDENTIAL STORAGE SYSTEM
<u>402</u>

OBTAIN THE UPDATED CREDENTIAL PROVIDED BY THE EXTERNAL CREDENTIAL MANAGER
<u>404</u>

REPLACE THE EXISTING CREDENTIAL STORED IN THE INTERNAL CREDENTIAL STORAGE SYSTEM WITH THE UPDATED CREDENTIAL
<u>406</u>

ACCESS THE INTERNAL CREDENTIAL STORAGE SYSTEM TO OBTAIN THE UPDATED CREDENTIAL
<u>408</u>

PERFORM AN AUTHENTICATION PROCESS TO PROVIDE ACCESS TO A PROTECTED COMPUTING RESOURCE
<u>410</u>

RECEIVE A NON-USER IDENTIFIER AS AN INPUT PARAMETER
502

LOCATE, USING THE NON-USER IDENTIFIER, AN EXISTING CREDENTIAL IN
AN INTERNAL CREDENTIAL STORAGE SYSTEM
504

REPLACE THE EXISTING CREDENTIAL WITH AN UPDATED CREDENTIAL
506

500

CREDENTIAL ROTATION USING A PROCESS AUTOMATION TOOL

TECHNICAL FIELD

This application generally relates to computer security, and more particularly to systems, methods, and non-transitory, computer-readable media to rotate a credential using a process automation tool.

BACKGROUND

Credential rotation is a security practice in which one or more credentials are changed or reset after a predefined time window has passed. Changing the credentials periodically or at predefined time intervals can limit a lifespan of the credentials during which the credentials are valid. Credential rotation can prevent or reduce a likelihood of unauthorized access to protected computing resources.

BRIEF SUMMARY

Techniques are provided for rotating a credential using a process automation tool. Various embodiments are described herein, including methods, systems, non-transitory computer-readable storage media storing programs, code, or instructions executable by one or more processors, and the like.

One embodiment is directed to a computer-implemented method for rotating a credential using a process automation tool. The method can include requesting, by a first process automation tool using an application programming interface (API) call and from an external credential manager, an updated credential to replace an existing credential stored in an internal credential storage system. Additionally, the method can include obtaining, by the first process automation tool and from an output of the API call, the updated credential provided by the external credential manager. The method can further include accessing, by the first process automation tool, the existing credential stored in the internal credential storage system. The method can include replacing, by the first process automation tool, the existing credential stored in the internal credential storage system with the updated credential. The method can include, subsequent to the first process automation tool replacing the existing credential stored in the internal credential storage system with the updated credential, accessing, by a second process automation tool, the internal credential storage system to obtain the updated credential. The method can include performing, by the second process automation tool, an authentication process to provide access to a protected computing resource.

In some embodiments, a system includes one or more processors and one or more memories storing computer-executable instructions that, when executed by the one or more processors, causes the one or more processors to perform one or more operations. The operations can include requesting, by a first process automation tool using an application programming interface (API) call and from an external credential manager, an updated credential to replace an existing credential stored in an internal credential storage system. The operations additionally can include obtaining, by the first process automation tool and from an output of the API call, the updated credential provided by the external credential manager. The operations can further include accessing, by the first process automation tool, the existing credential stored in the internal credential storage system.

The operations can include replacing, by the first process automation tool, the existing credential stored in the internal credential storage system with the updated credential. The operations can include, subsequent to the first process automation tool replacing the existing credential stored in the internal credential storage system with the updated credential, accessing, by a second process automation tool, the internal credential storage system to obtain the updated credential. Additionally, the operations can include performing, by the second process automation tool, an authentication process to provide access to a protected computing resource.

In some embodiments, a non-transitory computer-readable storage medium storing computer-executable instructions that, when executed with one or more processors of a computing device, causes the computing device to perform one or more operations. The operations can include requesting, by a first process automation tool using an application programming interface (API) call and from an external credential manager, an updated credential to replace an existing credential stored in an internal credential storage system. The operations can include obtaining, by the first process automation tool and from an output of the API call, the updated credential provided by the external credential manager. The operations can include accessing, by the first process automation tool, the existing credential stored in the internal credential storage system. The operations can include replacing, by the first process automation tool, the existing credential stored in the internal credential storage system with the updated credential. The operations can include, subsequent to the first process automation tool replacing the existing credential stored in the internal credential storage system with the updated credential, accessing, by a second process automation tool, the internal credential storage system to obtain the updated credential. The operations can include performing, by the second process automation tool, an authentication process to provide access to a protected computing resource.

BRIEF DESCRIPTION OF THE DRAWINGS

Various embodiments in accordance with the present disclosure will be described with reference to the drawings, in which:

FIG. 1 is an example flow for rotating a credential using a credential rotation system, in accordance with at least one embodiment;

FIG. 4 is a block diagram illustrating an example method for using a first process automation tool to rotate a credential and for using a second process automation tool to provide access to a protected computing resource, in accordance with at least one embodiment;

DETAILED DESCRIPTION

Figure 2:
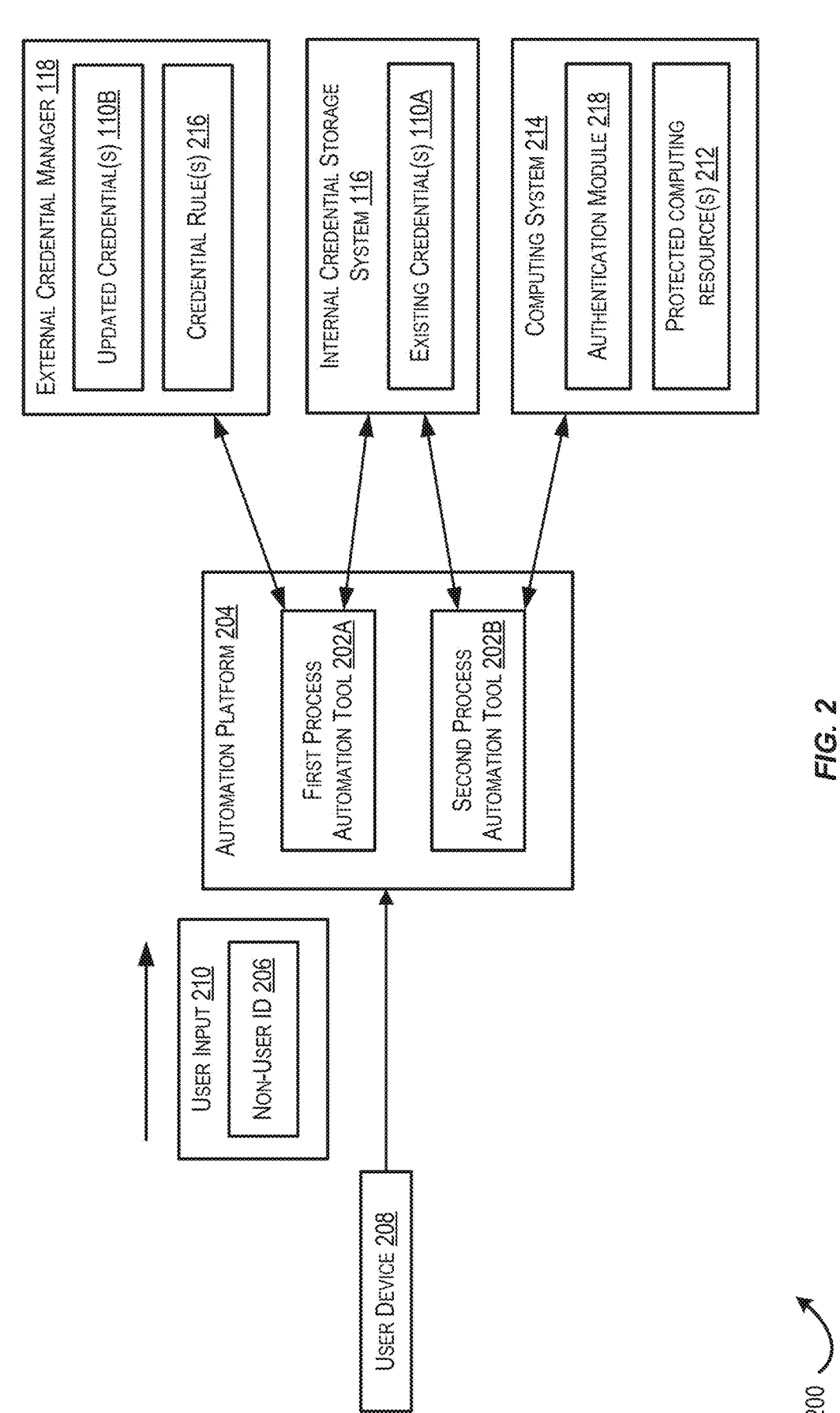
FIG. 2 is an example block diagram illustrating an example system for rotating a credential using a process automation tool, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to rotating one or more credentials using a process automation tool. In some embodiments, techniques are described for using a first process automation tool to rotate an existing credential stored in an internal credential storage system by replacing the existing credential with an updated credential provided by an external credential manager. In some embodiments, the external credential manager can be a third-party or external service that can generate or otherwise output the updated credential. Techniques are also described herein with respect to using a second process automation tool to obtain the updated credential from the internal credential storage system and use the updated credential to provide or obtain access to a protected computing resource. Various embodiments are described herein, including methods, systems, non-transitory computer-readable storage media storing programs, code, or instructions executable by one or more processors, and the like. The programs, code, or instructions can be executable to cause one or more operations to be performed.

Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The disclosed techniques disclosed herein provide improvements to rotating a credential of an internal credential storage system. In particular, the credential may be replaced with an updated credential generated by an external credential manager separate from the internal credential storage system. For example, certain security protocols may involve isolating the external credential manager from the internal credential storage system, such as by preventing communication between the external credential manager and the internal credential storage system. The disclosed methods can enable a replacement of an existing credential in the internal credential storage system with the updated credential generated by the external credential manager despite the internal credential storage system and the external credential manager not being in direct communication with each other. In some embodiments, communicatively coupling the internal credential storage system and the external credential manager can increase a security risk of unauthorized access to one or more credentials stored in the internal credential storage system. For example, a malicious actor obtaining unauthorized access to the external credential manager can compromise future credentials that can be generated by the external credential manager as well as credentials stored in the internal credential storage system that may currently be in use. Additionally, certain security regulations may prohibit direct communication between the internal credential storage system and the external credential manager, such as to implement a degree of isolation between the internal credential storage system and the external credential manager.

Conventional processes can involve manually rotating a credential. Manually performing a respective credential rotation for each credential stored in the internal credential storage system can be inefficient, time-consuming, and prone to error. For example, manually rotating a credential may involve a user separately interacting with the internal credential storage system and the external credential manager to obtain the updated credential from the external manager and replace the existing credential in the internal credential storage system with the updated credential. Additionally, manual input can be prone to typographical errors and can be inefficient to verify. For example, due to a lack of communication between the internal credential storage system and the external credential manager, conventional verification of the manual credential rotation can involve having at least one separate reviewer verify the manual input of the user.

The credential rotation system described herein provides improvements to conventional processes by automatically rotating a credential in the internal credential storage system using a process automation tool that can interact with the internal credential storage system and the external credential manager. By way of example, the process automation tool can be a software robot that can perform one or more rule-based tasks across various applications or systems. In particular, the process automation tool can automatically perform its tasks to interact with the internal credential storage system and the external credential manager and rotate an existing credential stored in the internal credential storage system. In some embodiments, the process automation tool can be a robotic process automation tool that can be programmed to perform one or more computer-based tasks by mimicking human-computer interactions. The tasks performed by process automation tools can be less error-prone compared to manual input and can be performed at a quicker rate, resulting in improved efficiency compared to conventional processes.

Moving on to FIG. 1 which illustrates an example flow 100 for rotating a credential 110 using a credential rotation system, in accordance with at least one embodiment. The operations discussed in connection with FIG. 1 may be performed with a credential rotation system 112. In some embodiments, the credential rotation system 112 may be implemented by one or more computer(s), as a service, within an application, or the like. The operations discussed in connection with FIG. 1 may be performed in any suitable order. More or fewer operations than those depicted in FIG. 1 may be employed without diverting from this disclosure.

The flow 100 may begin at block 102, where the credential rotation system 112 can obtain one or more input parameters 114 that can be used to identify a credential for which to perform a credential rotation process. In some embodiments, an internal credential storage system 116 can store one or more credentials that can each be used to access a corresponding computing component (e.g., a software application, a service, a database, etc.). In some embodiments, at least one input parameter received by the credential rotation system 112 can include or otherwise indicate a unique identifier corresponding to the credential to be rotated or replaced. The unique identifier can be a sequence of alphanumeric characters (e.g., a string). In some embodiments, the unique identifier can be a non-user identifier. In general, a non-user identifier can be associated with a computing component, such as a database, a software application, a service, etc. In some embodiments, the unique identifier can be a logical name, such as a user-defined name corresponding to the computing component. The credential rotation system 112 can map the logical name to the corresponding computing component, thereby determining which credential to rotate. For example, the credential rotation system 112 may access a database or another suitable storage system storing one or more mappings that can each link a logical name to the corresponding computing component.

In some embodiments, the credential rotation system 112 can be in communication with a user device, such as via a network (e.g., the Internet) or another suitable form of wireless or wired communication. By way of example, the credential rotation system 112 can receive user input from the user device indicating the unique identifier. In some implementations, the user input can include a dataset providing a respective unique identifier corresponding to each credential that will expire within a predefined time window (e.g., the next ten days, within a month, etc.). Expiration of a credential can correspond to a predefined time limit (e.g., 180 days, a year, 3 months, etc.) prior to which the credential is valid or active. By way of example, the dataset can be provided in a structured format (e.g., as a table or in a spreadsheet). In some embodiments, the credential rotation system 112 may automatically determine a set of unique identifiers corresponding to certain credentials that are close to expiration. By way of example, the credential rotation system 112 can access a data structure (e.g., a file, a database, a table, etc.) that can provide expiration information of the credentials stored in the internal credential storage system 116. The credential rotation system 112 then can apply a rule set to identify a subset of the credentials that has an expiration date within the predefined time window.

The flow 100 may continue at block 104, where the credential rotation system 112 can request an updated credential 110B to replace an existing credential 110A stored in the internal credential storage system 116. As described herein, the existing credential 110A can be used to access a corresponding computing component. In some embodiments, the internal credential storage system 116 can be part of an automation platform that can include one or more software robots that can automatically perform a series of tasks in a predefined process. Certain tasks may involve accessing different computing components, such as accessing a database to retrieve specific data. By way of example, the existing credential 110A can be an authentication factor that a software bot can input to validate its access permissions and obtain access to the database. Additionally, in some embodiments, at least one software robot of the automation platform can be part of the credential rotation system 112. In particular, a software robot of the automation platform may automatically perform one or more of the steps described herein to rotate the existing credential 110A.

In some embodiments, the credential rotation system 112 can communicate with an external credential manager 118 to request the updated credential 110B. For example, the credential rotation system 112 can use an application programming interface (API) call to request that the external credential manager 118 provide or generate the updated credential. The credential rotation system 112 can pass the unique identifier via the API call to the external credential manager 118. Based on the unique identifier, the external credential manager 118 can output a suitable credential to replace the existing credential 110A corresponding to the unique identifier. By way of example, certain software applications or services may have a respective set of criteria for a credential used to access the software applications or services. Providing the unique identifier to the external credential manager 118 can enable the external credential manager 118 to identify a corresponding software application or service. The external credential manager 118 then can output a credential that complies with the set of criteria associated with the corresponding software application or service.

The flow 100 may continue at block 106, where the credential rotation system 112 can obtain the updated credential 110B from an output 120 of the API call, such as a file. In some embodiments, the credential rotation system 112 can parse or analyze the API output 120 to obtain the updated credential 110B. For example, the credential rotation system 112 may receive a text-based output as the API output 120. The credential rotation system 112 may search the text-based output to locate the updated credential 110B, such as using a string search or a keyword search. Other output formats (e.g., Javascript Object Notation (J SON) or Extensible Markup Language (XML)) of the API output 120 are possible.

The flow 100 can continue at block 108, where the credential rotation system 112 can replace the existing credential 110A stored in the internal credential storage system 116 with the updated credential 110B received from the external credential manager 118. In some embodiments, the credential rotation system 112 can identify or locate the existing credential 110A in the internal credential storage system 116 using the unique identifier received as part of the input parameters 114. Once the credential rotation system 112 locates the existing credential 110A, the credential rotation system 112 can replace the existing credential 110A with the updated credential 110B from the external credential manager 118. In some embodiments, the credential rotation system 112 may schedule the replacement of the existing credential 110A to minimize disruption to other operations. For example, the credential rotation system 112 may use historical usage or access of the existing credential 110A to determine a suitable time at which to update the existing credential.

FIG. 2 is an example block diagram 200 illustrating an example system for rotating a credential 110 using a process automation tool 202, in accordance with at least one embodiment. Certain aspects of FIG. 2 are described below with reference to components of FIG. 1. In the example of FIG. 2, the system can include an automation platform 204 hosting one or more process automation tools 202. As shown, the automation platform 204 includes a first process automation tool 202A and a second process automation tool 202B. Although two process automation tools are shown, it will be appreciated that a different number of process automation tools are possible.

In some embodiments, the automation platform 204 can oversee or manage the process automation tools 202. For example, the automation platform 204 can provide a user interface that can receive user input providing instructions to build a new process automation tool or modify an existing process automation tool. In some implementations, the instructions of the user input can define a process including one or more tasks to be performed by a process automation tool. Non-limiting examples of the tasks can include logging into one or more accounts, applying one or more rule sets, generating a data structure (e.g., a file, a spreadsheet, etc.), extracting data from documents, flagging discrepancies between a dataset and one or more expected values, etc. By way of example, a process automation tool can apply optical character recognition to an image of a scanned document to extract text-based information from the image and transfer the text-based information to a spreadsheet. Accordingly, the process automation tool can transform or convert unstructured data (e.g., text) into structured data (e.g., a table, spreadsheet, array, etc.). In some embodiments, certain tasks can be defined by a reusable object, which can enable users to include the same task or a similar task in different processes.

In some embodiments, the automation platform 204 can schedule a respective operation of the process automation tools 202. For example, when creating a process automation tool, one or more scheduling parameters can be defined. In some implementations, at least one scheduling parameter can include a frequency by which a predefined process is repeated by the process automation tool. In some implementations, at least one scheduling parameter can include a time period within which the process automation tool is active. By way of example, a particular process automation tool may be defined to be active during weekdays due to it receiving documents used to perform a specific task in its predefined process on weekdays and not during weekends. Scheduling an operation of the particular process automation tool to limit its operation can conserve computing resources by forgoing to perform the predefined process when the particular process automation tool may be unable to perform at least one task in the predefined process. In some embodiments, at least one scheduling parameter can correspond to a trigger condition of the predefined process or a specific task of the predefined process. Once the trigger condition is fulfilled or activated, the process automation tool may initiate the predefined process or the specific task. As an example, the trigger condition of the first process automation tool 202A can include receiving user input indicating a non-user identifier 206 corresponding to an existing credential 110A about to expire. As another example, the trigger condition of the first process automation tool 202A can include a predefined period of time being exceeded, which can cause the first process automation tool 202A to initiate a credential rotation process. The predefined period of time can correspond to an expiration date of the credential to be rotated or replaced.

In some embodiments, the automation platform 204 can deactivate or remove at least one of the process automation tools 202, such as if a process automation tool exhibits unexpected or uncharacteristic behavior. Unexpected behavior can include any deviation from the predefined process assigned to the process automation tool. By way of example, the automation platform 204 may detect that the process automation tool has attempted to access a protected computing resource that is not part of the predefined process of the process automation tool. In some examples, unexpected behavior may indicate that the process automation tool has been compromised, such as being modified by a malicious actor.

In some embodiments, the automation platform 204 can be in communication with a user device 208. For example, a user may provide user input 210 via a user interface of the automation platform 204 outputted for display by the user device 208. In some embodiments, the user input 210 can include a non-user identifier 206 that can identify a component of a computing system, such as a data structure, a software application, a software service, etc.

In some embodiments, the first process automation tool 202A can use the non-user identifier 206 to perform a credential rotation process that can include replacing an existing credential 110A with an updated credential 110B. In some embodiments, the second process automation tool 202B can use the existing credential 110A or the updated credential 110B to access or provide access to a corresponding computing component, such as one or more protected computing resources 212. As described herein, the credentials 110A-B can be an authentication factor by which to obtain access to the protected computing resources 212. For example, a computing system 214 hosting or otherwise providing the protected computing resources 212 may implement an access control policy that prevents unauthorized entities from accessing the protected computing resources 212. The credentials 110A-B can verify an identity of the second process automation tool 202B, thereby enabling the second process automation tool 202B to access the protected computing resources 212.

In some embodiments, rotating the existing credential 110A can involve obtaining the updated credential 110B to replace the existing credential 110B. In some embodiments, the first process automation tool 202A can communicate with an external credential manager 118 to obtain the updated credential 110B. In some embodiments, the first process automation tool 202A may use an application programming interface (API) call to pass the non-user identifier 206 to the external credential manager 118. Based on the non-user identifier 206, the external credential manager 118 can generate or output a suitable credential as the updated credential 110B to transmit to the first process automation tool 202A, such as via an output of the API call. In some embodiments, the external credential manager 118 can apply one or more credential rules 216 to provide the suitable credential. By way of example, certain applications may require that a credential includes a minimum number of characters (e.g., a predefined length) or include at least one special character (e.g., a symbol, punctuation, etc.). In some embodiments, each protected computing component can correspond to a respective subset of the credential rules 216. For example, using the non-user identifier 206, the external credential manager 118 can identify a corresponding subset of the credential rules 216 to apply to determine the updated credential 110B.

Once the first process automation tool 202A obtains the updated credential 110B, the first process automation tool 202A can access the internal credential storage system 116 to locate the existing credential 110A to replace with the updated credential 110B. In some embodiments, the first process automation tool 202A can use the non-user identifier 206 to search the internal credential storage system 116 and locate the existing credential 110A. Once the existing credential 110A stored in the internal credential storage system 116 is located, the first process automation tool 202A can update the existing credential 110A by replacing the existing credential 110A with the updated credential 110B. Replacing the existing credential 110A with the updated credential 110B can invalidate the existing credential 110A (e.g., cause the existing credential 110A to be non-functional or invalid).

In some embodiments, prior to the first process automation tool 202A completing the credential rotation process, the automation platform 204 may pause other process automation tools configured to use the existing credential 110A to perform one or more tasks. Accordingly, the automation platform 204 can prevent the other automation tools from retrieving an invalid credential from the internal credential storage system 116. By way of example, the automation platform 204 can use the non-user identifier 206 to determine a corresponding protected computing resource associated with the existing credential 110A to be rotated. The automation platform 204 then can identify the other process automation tools that are configured to access the corresponding protected computing resource using the existing credential 110A and pause an operation of the other process automation tools. The automation platform 204 can resume the operation of the other process automation tools once the first process automation tool 202A completes the credential rotation process (e.g., replaces the existing credential 110A with the updated credential 110B).

In some embodiments, the internal credential storage system 116 can be a secure repository storing one or more credentials that can enable the process automation tools to access target applications or other suitable protected computing resources. In some embodiments, the internal credential storage system 116 can implement encryption or other suitable security techniques to prevent the stored credentials in the internal credential storage system 116 from being accessed or used by unauthorized entities. Examples of encryption can include symmetric encryption or asymmetric encryption. Symmetric encryption can involve using the same encryption key to perform encryption and decryption. Conversely, asymmetric encryption can involve using different encryption keys (e.g., a public-private key pair) to perform encryption and decryption.

In some embodiments, the automation platform 204 and the internal credential storage system 116 can be part of the same system. The automation platform 204 or specific process automation tools (e.g., the first and second process automation tools 202A-B) can be authorized to access or retrieve the credentials stored in the internal credential storage system 116. By way of example, the first process automation tool 202A can be assigned a role recognized by a role-based access control system of the internal credential storage system 116 as having suitable permissions to access and modify the existing credential 110A. Other roles may afford different permissions (e.g., read-only permissions). Accordingly, using the first process automation tool 202A of the automation platform 204 to perform the credential rotation process can minimize interactions by an external component with the internal credential storage system, thereby reducing a likelihood of a security breach.

Once the existing credential 110A has been rotated, the second process automation tool 202B can access the internal credential storage system 116 to retrieve the updated credential 110B. In some embodiments, the second process automation tool 202B can be authorized to access the internal credential storage system 116 but not modify the credentials stored in the internal credential storage system 116 (e.g., the existing credential 110A). For example, the second process automation tool 202B may be assigned a role corresponding to read-only permissions with respect to the internal credential storage system 116. In some embodiments, retrieving the updated credential 110B can be part of performing a task in a predefined process of the second process automation tool 202B. The second process automation tool 202B can use the updated credential 110B as an authentication factor to verify an identity or access privileges of the second process automation tool 202B. In some embodiments, performing the task can include handling data between the protected computing resource 212 and at least one additional computing resource. As an example, the second process automation tool 202B can retrieve the updated credential 110B to access a database in the computing system 214 and retrieve specific data stored in the database to input at an additional computing resource. As another example, the second process automation tool 202B can input the updated credential 110B to access a software application configured to generate a report. Once the second process automation tool 202B uses the updated credential 110B to access the software application, the second process automation tool 202B can provide information to the software application to include in the report to be generated by the software application.

In some embodiments, the second process automation tool 202B can provide the updated credential 110B (e.g., a login credential) to the computing system 214. In some embodiments, an authentication module 218 of the computing system 214 can verify whether the second process automation tool 202B is authorized to access the database or another suitable protected computing resource. For example, the authentication module 218 can compare the updated credential 110B provided by the second process automation tool 202B with an expected value. Based on the updated credential 110B matching the expected value, the authentication module 218 can determine that the second process automation tool 202B is authorized to access the database. Conversely, if the authentication module 218 detects a discrepancy between the updated credential 110B provided by the second process automation tool 202B and the expected value, the authentication module 218 may prevent the second process automation tool 202B from accessing the database. In some embodiments, the authentication module 218 may alert the automation platform 204 or another suitable component to indicate that the discrepancy was detected. Once the automation platform 204 receives an alert or notification from the authentication module 218, the automation platform 204 may perform an action, such as flagging the second process automation tool 202B or pausing an operation of the second process automation tool 202B.

Figure 3:
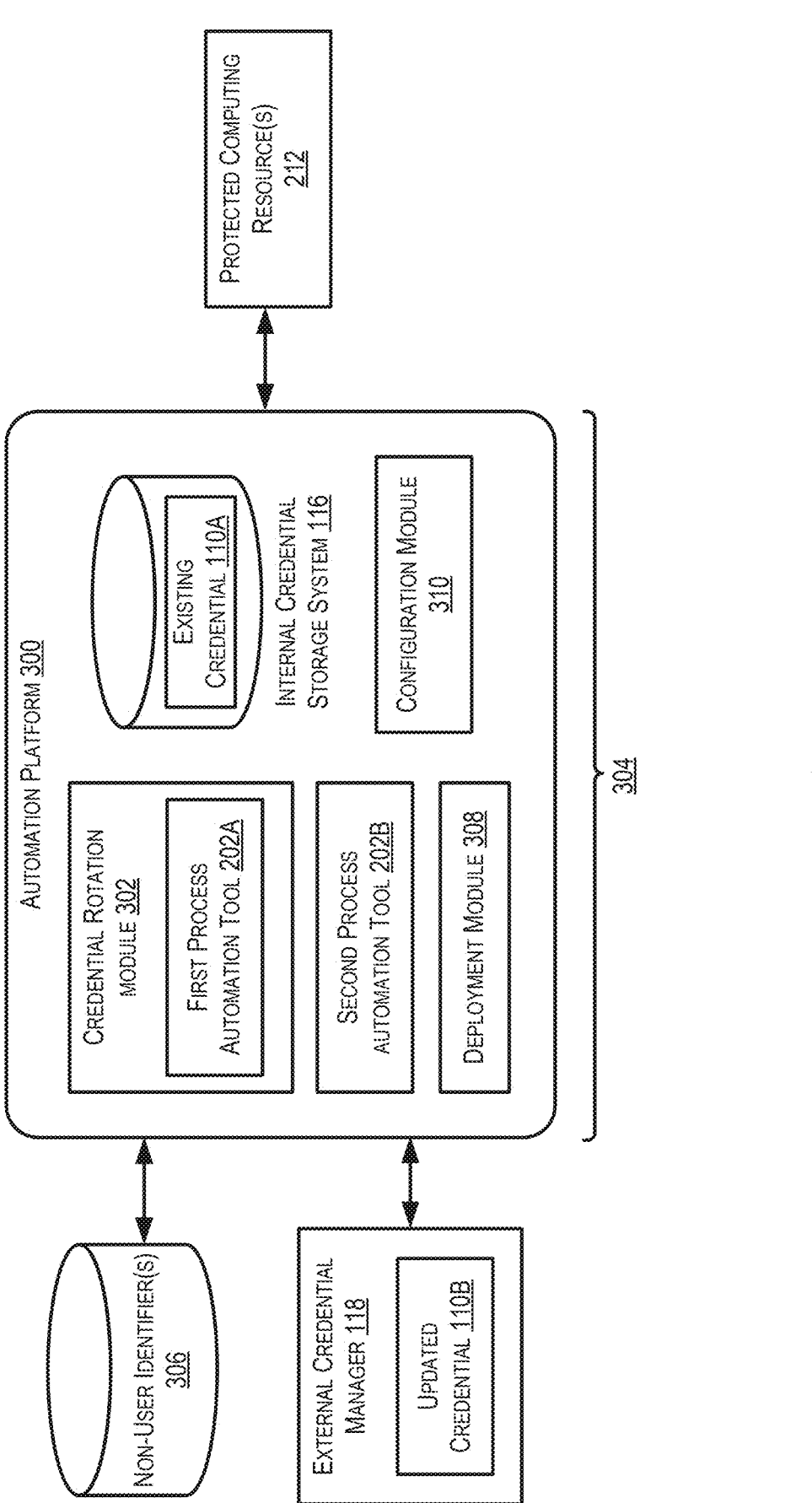
FIG. 3 is a schematic diagram of an example computer architecture for an automation platform including a credential rotation module and a plurality of modules that may perform functions in accordance with at least one embodiment.

FIG. 3 is a schematic diagram of an example computer architecture for an automation platform 300 including a credential rotation module 302 and one or more modules that may perform functions in accordance with at least one embodiment. In some embodiments, the automation platform 300 can be the automation platform 204 of FIG. 2. Certain aspects of FIG. 3 are described with reference to components of one or more previous figures (e.g., FIG. 1 or FIG. 2). The modules 304 may be software modules, hardware modules, or a combination thereof. If the modules are software modules, the modules can be embodied on a computer readable medium and processed by a processor in any of the computer systems described herein. It should be noted that any module or data store described herein, may be, in some embodiments, be a service responsible for providing functionality corresponding to the module described below. The modules 304 may be execute as part of the automation platform 300, or the modules 304 may exist as separate modules or services external to the automation platform 300. In some embodiments, the modules 304 may be executed by the same or different computing devices, as a service, as an application, or the like.

In the embodiment shown in the FIG. 3, data stores such as a database 306 storing non-user identifiers are shown, although data can be maintained, derived, or otherwise accessed from various data stores, either remote or local to the automation platform 300, to achieve the functions described herein. The automation platform 300, as shown in FIG. 3, includes various modules such as the credential rotation module 302, a deployment module 308, and a configuration module 310. The automation platform 300 can include one or more process automation tools 202, such as a first process automation tool 202A, a second process automation tool 202B, or one or more additional process automation tools. Some functions of the modules 302, 308, and 310 are described in the following paragraphs. In accordance with at least one embodiment, a process of rotating a credential using a process automation tool is provided.

In at least one embodiment, the automation platform 300 includes the credential rotation module 302. Generally, the credential rotation module 302 may be rotate a credential with respect to any example provided herein. In some embodiments, the credential rotation module 302 can include the first process automation tool 202A that can interact with an external credential manager 118 and an internal credential storage system 116. As shown in FIG. 3, the internal credential storage system 116 can be part of the automation platform 300 and can store an existing credential 110A to be rotated or replaced. As described herein, the first process automation tool 202A can communicate with the external credential manager 118 to obtain an updated credential 110B to replace the existing credential 110A in the internal credential storage system 116. In some embodiments, once the updated credential 110B replaces the existing credential 110A, the updated credential 110B can be a new existing credential that may be replaced with a different credential provided by the external credential manager 118 at a later point in time.

In at least one embodiment, the automation platform 300 includes the deployment module 308. Generally, the deployment module 308 can be used to deploy the process automation tools 202 of the automation platform 300, such as the first process automation tool 202A or the second process automation tool 202B. In some embodiments, deployment of the process automation tools 202 can involve allocating resources (e.g., processing power, storage, etc.) to individual process automation tools to ensure that the process automation tools can perform their respective predefined processes. In some embodiments, the deployment module 308 can manage a priority system of the process automation tools 202, such as to determine which process automation tool may receive priority in an event of conflicting operation between different process automation tools. For example, the first process automation tool 202A may be assigned a higher priority compared to the second process automation tool 202B based on tasks configured to be performed by the first process automation tool 202A. In some embodiments, deployment of the process automation tools 202 can involve scheduling a respective operation of the process automation tools 202, such as a frequency by which the first process automation tool 202A performs the credential rotation process. By way of example, the deployment module 308 can schedule the first process automation tool 202A to replace or rotate the existing credential 110A every three months.

In at least one embodiment, the automation platform 300 includes the configuration module 310. Generally, the configuration module 310 can enable a user to build the process automation tools 202, such as by defining a series of specific tasks to include in a predefined process. In some embodiments, the configuration module 310 can output a user interface for presentation to the user, such as via a display of a user device (e.g., the user device 208 of FIG. 2). The user can interact with the user interface to provide user input defining the tasks to be performed by a particular process automation tool. In some embodiments, the user interface can include one or more visual components (e.g., shapes or symbols) to represent a respective task. By way of example, the user can interact with the user interface to select or arrange the visual components to indicate a sequence in which to perform the tasks. In some embodiments, the user interface can receive user input to generate a codebase corresponding to a particular process automation tool. By way of example, the codebase can include source code providing instructions executable by the particular process automation tool to perform the tasks in its predefined process.

FIG. 4 is a block diagram illustrating an example method 400 for using a first process automation tool 202A to rotate a credential and for using a second process automation tool 202B to provide access to a protected computing resource 212, in accordance with at least one embodiment. A non-transitory computer-readable storage medium may store computer-executable instructions that, when executed by at least one processor, cause at least one computer to perform instructions comprising the operations of the method 400. It should be appreciated that the operations of the method 400 may be performed in any suitable order, not necessarily the order depicted in FIG. 4. Further, the method 400 may include additional, or fewer operations than those depicted in FIG. 4. The operations of method 400 may be performed by any suitable portion of the credential rotation system 112 of FIG. 1. In some embodiments, method 400 may be executed by components of the automation platform 300 of FIG. 3. Certain aspects of FIG. 4 are described with reference to components of one or more previous figures (e.g., FIG. 2).

The method 400 may begin at block 402, where the first process automation tool 202A can request an updated credential 110B from an external credential manager 118 to replace an existing credential 110A stored in an internal credential storage system 116. In some embodiments, the external credential manager 118 can be remote from or otherwise separate from the internal credential storage system 116. The external credential manager 118 may be unable to directly communicate with the internal credential storage system 116. The first process automation tool 202A can function as an intermediary by separately communicating with the external credential manager 118 and the internal credential storage system 116. The first process automation tool 202A and the internal credential storage system 116 can be part of the same system (e.g., an automation platform 300). In some embodiments, the automation platform 300 can be used to build and deploy one or more process automation tools 202, including the first process automation tool 202A. The internal credential storage system 116 can store one or more credentials used by the process automation tools 202 to perform one or more tasks in a respective predefined process. As an example, the first process automation tool 202A can be a robotic process automation tool that can be configured to automatically perform a credential rotation process of continually updating the existing credential 110A. In some embodiments, the existing credential 110A can be referred to as a current credential.

As an example, the first process automation tool 202A can use an application programming interface (API) call to communicate with the external credential manager 118. The API call can pass a unique identifier (e.g., a non-user identifier 206) corresponding to the existing credential 110A from the first process automation tool 202A to the external credential manager 118. In some examples, the non-user identifier 206 can identify a second process automation tool 202B for which to obtain an updated credential 110B from the external credential manager 118. As an example, the second process automation tool 202B can be a robotic process automation tool configured to perform an automated process by emulating one or more human interactions involving access to the protected computing resource 212. In some embodiments, the non-user identifier 206 can be referred to as an "NU ID." As another example, the first process automation tool 202A can transmit a credential request to the external credential manager 118 to request the updated credential 110B from the external credential manager 118. The credential request can include the non-user identifier 206 such that the external credential manager 118 can provide a suitable credential as the updated credential 110B. Certain credentials may have requirements to comply with security standards or to reduce a likelihood of the credentials being compromised. In some embodiments, the requirements of the credentials can correspond to a length of the credential, contents of the credential (e.g., including symbols, letters, and numbers), or a combination thereof.

The method 400 may continue at block 404, where the first process automation tool 202A can obtain the updated credential 110B provided by the external credential manager 118. In some embodiments, an output (e.g., an API output) received from the external credential manager 118 can indicate or include the updated credential 110B. By way of example, the first process automation tool 202A can parse the output to extract the updated credential 110B. In some embodiments, the output or the updated credential 110B can be encrypted. The first process automation tool 202A may retrieve an encryption key from the external credential manager 118 or another external system to decrypt the output or the updated credential 110B prior to obtaining the updated credential 110B.

The method 400 may continue at block 406, where the first process automation tool 202A can replace the existing credential 110A stored in the internal credential storage system 116 with the updated credential 110B. After locating the existing credential 110A in the internal credential storage system 116, the first process automation tool 202A can modify the existing credential 110A by replacing the existing credential 110A with the updated credential 110B received from the external credential manager 118. In some embodiments, the first process automation tool 202A can use the unique identifier to locate the existing credential 110A, such as by performing a lookup operation or a string search.

In some embodiments, prior to modifying the internal credential storage system 116, the first process automation tool 202A may perform an authentication process with respect to the internal credential storage system 116 to verify that the first process automation tool 202A is authorized to access and modify the existing credential 110A. For example, the first process automation tool 202A may be assigned a role that can indicate one or more access privileges associated with the first process automation tool 202A. The authentication process of the internal credential storage system 116 can verify the role and associated access privileges of the first process automation tool 202A.

The method 400 may continue at block 408, where the second process automation tool 202B can access the internal credential storage system 116 to obtain the updated credential 110B. In some embodiments, the second process automation tool 202B can retrieve the updated credential 110B to perform a specific task in its predefined process. By way of example, the second process automation tool 202B can perform a task that involves accessing a protected computing resource 212 (e.g., a software service) to retrieve information or to generate an output. Accordingly, the second process automation tool 202B can obtain the updated credential 110B prior to performing the task.

The method 400 may continue at block 410, where the second process automation tool 202B can perform an authentication process to provide access to the protected computing resource 212. In some embodiments, the second process automation tool 202B can provide the updated credential 110B as part of performing the authentication process. For example, the protected computing resource 212 can be part of a computing system 214 that can include an authentication module 218 that can receive the updated credential 110B. In some embodiments, the second process automation tool 202B may provide additional information to access the protected computing resource 212. For example, the second process automation tool 202B may include a username as an identifier of the second process automation tool 202B along with the updated credential 110B to perform the authentication process. In some embodiments, the second process automation tool 202B may receive communication (e.g., a notification) from the authentication module 218 or another suitable component of the computing system regarding whether the authentication process has been successfully completed. For example, successfully completing the authentication process can involve the authentication module 218 determining that the second process automation tool 202B has suitable access privileges to access the protected computing resource 212.

In some embodiments, the second process automation tool 202B can access the protected computing resource 212 as part of performing a task in its predefined process. For example, the task can involve handling data between the protected computing resource 212 and at least one additional computing resource in the computing system 214. For example, the second process automation tool 202B can transfer data from the protected computing resource 212 to the at least on additional computing resource or vice versa. In some embodiments, the data can include text-based data (e.g., text determined by applying optical character recognition). In some embodiments, the data can be stored in a data structure (e.g., a file) that can be transferred by the second process automation tool 202B between the protected computing resource 212 and at least one additional computing resource.

Figure 5:
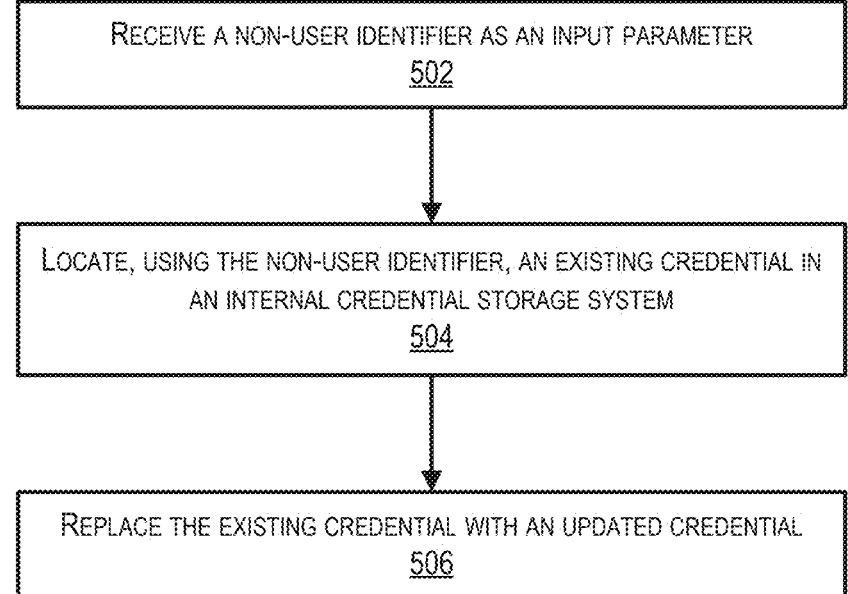
FIG. 5 is a block diagram illustrating an example method for rotating a credential using a robotic process automation tool, in accordance with at least one embodiment.

FIG. 5 is a block diagram illustrating an example method for rotating a credential using a robotic process automation (RPA) tool (e.g., the first process automation tool 202A or second process automation tool 202B of FIG. 2 or FIG. 3), in accordance with at least one embodiment. A non-transitory computer-readable storage medium may store computer-executable instructions that, when executed by at least one processor, cause at least one computer to perform instructions comprising the operations of the method 500. It should be appreciated that the operations of the method 500 may be performed in any suitable order, not necessarily the order depicted in FIG. 5. Further, the method 500 may include additional, or fewer operations than those depicted in FIG. 5. The operations of method 500 may be performed by any suitable portion the credential rotation system 112 of FIG. 1. In some embodiments, method 500 may be executed by components of the automation platform 300 of FIG. 3. Certain aspects of FIG. 5 are described with reference to components of one or more previous figures (e.g., FIG. 2).

The method 500 may begin at block 502, where the RPA tool can receive a non-user identifier 206 as an input parameter. In some embodiments, the RPA tool can receive the non-user identifier 206 as part of user input indicating which credential to rotate. In some embodiments, the RPA tool can receive the non-user identifier 206 from another process automation tool. By way of example, the RPA tool can be part of an automation platform 300 that can host one or more process automation tools. A particular process automation tool of the automation platform 300 can be configured to monitor one or more credentials stored in an internal credential storage system 116 to flag a subset of the credentials that are close to expiration (e.g., within ten days of a respective expiration date). The particular process automation tool may transmit the non-user identifier 206 to the RPA tool. The non-user identifier 206 received by the RPA tool can correspond to a flagged credential. In some embodiments, the RPA tool can initiate a predefined process in response to receiving the non-user identifier 206. The predefined process can include the steps performed as part of method 500. Additional or alternative steps can be included in the predefined process of the RPA tool. In some embodiments, the predefined process can be an automated process performed by the RPA tool by emulating one or more human interactions involving access to a protected computing resource 212. Examples of the human interactions can include selecting an interface element of the protected computing resource 212, inputting data via a user interface of the protected computing resource 212, etc. In some embodiments, the RPA tool can perform tasks that are traditionally performed manually.

The method 500 may continue at block 504, where the RPA tool can locate, using the non-user identifier 206, an existing credential 110A in an internal credential storage system 116. In some embodiments, the RPA tool can search the internal credential storage system 116 using the non-user identifier 206. For example, the internal credential storage system 116 can include a table with one or more mappings that can each link a respective non-user identifier to a corresponding credential stored in the internal credential storage system. The RPA tool can use the table and the non-user identifier 206 to determine the corresponding credential (e.g., the existing credential 110A). In some embodiments, the existing credential 110A can be a flagged credential that is close to expiration. The existing credential 110A can be a current credential stored in the internal credential storage system 116. The existing credential 110A can be accessible by the process automation tools 202 of the automation platform 300 to perform certain tasks involving access to a protected computing resource 212 associated with the existing credential 110A.

The method 500 may continue at block 506, where the RPA tool can replace the existing credential 110A with an updated credential 110B. As described herein, the RPA tool can retrieve the updated credential 110B from an external credential manager 118. Once the updated credential 110B is retrieved, the RPA tool can use its access to the internal credential storage system 116 to rotate the existing credential 110A by replacing the existing credential 110A with the updated credential 110B. After the existing credential 110A is replaced, the existing credential 110A can become invalid such that using the existing credential 110A to access the protected computing resource 212 can fail. In other words, after the RPA tool has rotated the existing credential 110A, a process automation tool can be unable to use the existing credential 110A to obtain or provide access to the protected computing resource 212. Replacing the existing credential 110A with the updated credential 110B can cause the updated credential 110B to become valid. Accordingly, the process automation tool can access the protected computing resource 212 using the updated credential 110B.

Figure 6:
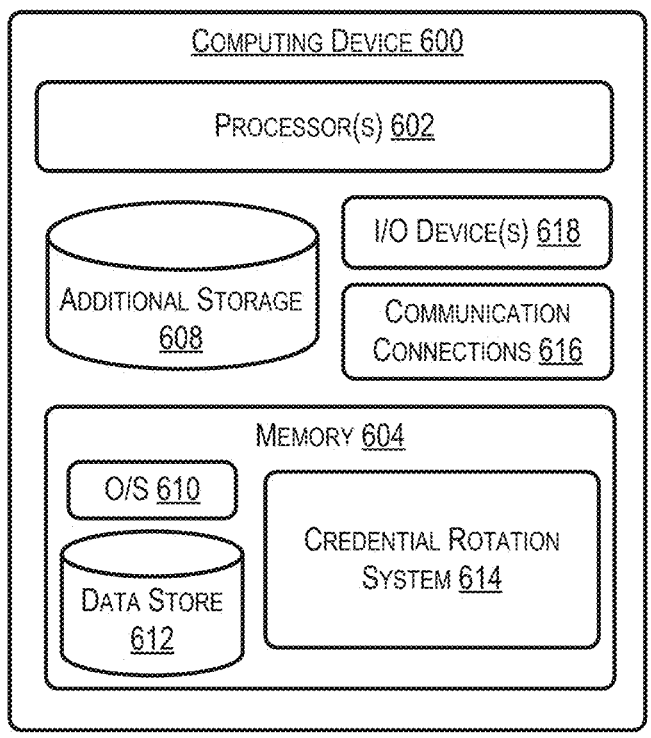
FIG. 6 illustrates an example computing device that may implement the methods disclosed herein.

FIG. 6 illustrates an example computing device 600 that may implement the methods disclosed herein. In some embodiments, the computing device 600 may include one or more processors (e.g., processor(s) 602). The processor(s) 602 may be implemented in hardware, computer-executable instructions, firmware, or combinations thereof. Computer-executable instruction or firmware implementations of the processor(s) 602 may include computer-executable or machine-executable instructions written in any suitable programming language.

Computing device 600 may include memory 604. The memory 604 may store computer-executable instructions that are loadable and executable by the processor(s) 602, as well as data generated during the execution of these programs. The memory 604 may be volatile (such as random-access memory (RAM)) and/or non-volatile (such as ROM, flash memory, etc.). The computing device 600 may include additional storage 606, which may include removable storage and/or non-removable storage. The additional storage 606 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 604 or additional storage 608 may individually, or collectively, include multiple different types of memory, such as SRAM, DRAM, or ROM.

The memory 604 and/or additional storage 608 may be examples of computer-readable storage media. Computer-readable storage media may include volatile, or non-volatile, removable or non-removable media implemented in any method or technology for storage of information such as computer-readable instructions, data structures, program modules, or other data. In some embodiments, memory 604 and the additional storage 608 are examples of computer storage media. Memory 604 and/or additional storage 608 may include, but are not limited to, PRAM, SRAM, DRAM, RAM, ROM, EEPROM, flash memory or other memory technology, CD-ROM, DVD, magnetic tape, magnetic disk storage or other magnetic storage devices, or any other medium which can be used to store the desired information and which can be accessed by the computing device 600. Combinations of any of the above should also be included within the scope of computer-readable media. Computer-readable media may include computer-readable instructions, program modules, or other data transmitted within a data signal, such as a carrier wave, or other transmission. However, as used herein, computer-readable storage media does not include computer-readable communication media.

The memory 604 may include an operating system 610 and one or more data stores 612, and/or one or more application programs, modules, or services for implementing the features disclosed herein, such as the features provided by the credential rotation system 614 (e.g., an example of the credential rotation module 302 of FIG. 3).

The computing device may also contain communications connection(s) 616 that allow the computing device 600 to communicate with a stored database, another computing device, a server, user terminals and/or other devices (e.g., via one or more networks, not depicted). The computing device may also include I/O device(s) 618, such as a keyboard, a mouse, a pen, a voice input device, a touch input device, a display, speakers, a printer, etc.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of worksta- tions running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

As a non-limiting example, the credential rotation system described herein (e.g., the credential rotation system 614 of FIG. 6) can be implemented to use a robotic process automation (RPA) tool to replace an existing credential stored in an internal credential system. For example, the RPA tool can perform a password reset to replace an existing password with an updated password. In some implementations, the credential rotation system can be part of an automation platform (e.g., Blue Prism) that can host one or more RPA tools, including the RPA tool configured to perform a credential rotation process to replace the existing credential. Each RPA tool can be configured to perform a predefined process including one or more tasks with little to no manual intervention. The automation platform can enable a user to create or modify an RPA tool, such as by defining or updating the tasks performed by the RPA tool.

In some implementations, the RPA tool can be a first RPA tool that can rotate or update a credential used by a second RPA tool of the automation platform. For example, the internal credential system can be part of the automation platform and can include one or more safes or vaults that can each store one or more credentials. To perform its tasks, the second RPA tool may access a specific vault of the internal credential system to obtain a particular credential, such as a login credential to access a software application. In some implementations, the first RPA tool can use an application programming interface (API) call to obtain an updated credential (e.g., an updated password) from an external credential manager, such as CyberArk. As an example, the API call can pass a non-user identifier corresponding to the second RPA tool to the external credential manager. Once the first RPA tool obtains the updated credential, the first RPA tool can access the internal credential system, such as a particular vault of the internal credential system, to replace an existing credential stored in the internal credential system with the updated credential. The second RPA tool then can access the internal credential system to retrieve the updated credential and perform at least one task using the updated credential. For example, the second RPA tool can use the updated credential as part of an authentication process to log into a secured computing system.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (such as in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

requesting, by a first process automation tool using an application programming interface (API) call and from an external credential manager, an updated credential to replace an existing credential stored in an internal credential storage system, wherein the first process automation tool comprises a scheduling parameter to automatically initiate the first process automation tool, wherein the scheduling parameter is defined based on a trigger condition corresponding to an expiration date of the existing credential;

obtaining, by the first process automation tool and from an output of the API call, the updated credential provided by the external credential manager;

accessing, by the first process automation tool, the existing credential stored in the internal credential storage system;

replacing, by the first process automation tool, the existing credential stored in the internal credential storage system with the updated credential;

subsequent to the first process automation tool replacing the existing credential stored in the internal credential storage system with the updated credential, accessing, by a second process automation tool, the internal credential storage system to obtain the updated credential, wherein the second process automation tool is a robotic process automation tool configured to perform an automated process involving access to a protected computing resource; and performing, by the second process automation tool, an authentication process to access the protected computing resource as part of performing the automated process, wherein performing the automated process further comprises mimicking a human-computer interaction involving the protected computing resource.

2. The computer-implemented method of claim 1, wherein the API call comprises a non-user identifier identifying the second process automation tool for which to obtain the updated credential from the external credential manager.

3. The computer-implemented method of claim 1, wherein the internal credential storage system is part of an automation platform used to build and deploy a plurality of process automation tools comprising the first process automation tool and the second process automation tool.

4. The computer-implemented method of claim 1, wherein the first process automation tool is another robotic process automation tool configured to automatically perform a credential rotation process by which a current credential associated with the second process automation tool is continually updated.

5. The computer-implemented method of claim 4, further comprising:

receiving, by the robotic process automation tool, a non-user identifier as an input parameter;

locating, by the robotic process automation tool and using the non-user identifier, the existing credential in the internal credential storage system; and subsequent to locating the existing credential, replacing, by the robotic process automation tool, the existing credential with the updated credential.

6. The computer-implemented method of claim 1, wherein the automated process comprises a predefined process having a series of tasks, and wherein performing at least one task of the series of tasks comprises handling data between the protected computing resource and at least one additional computing resource.

7. The computer-implemented method of claim 1, further comprising:

prior to the first process automation tool replacing the existing credential stored in the internal credential storage system with the updated credential, pausing an operation of another process automation tool configured to use the existing credential to perform one or more tasks; and subsequent to the first process automation tool replacing the existing credential stored in the internal credential storage system with the updated credential, resuming the operation of the other process automation tool.

8. A system, comprising:

one or more processors; and one or more memories storing computer-executable instructions that, when executed by the one or more processors, causes the one or more processors to:

request, by a first process automation tool using an application programming interface (API) call and from an external credential manager, an updated credential to replace an existing credential stored in an internal credential storage system, wherein the first process automation tool comprises a scheduling parameter to automatically initiate the first process automation tool, wherein the scheduling parameter is defined based on a trigger condition corresponding to an expiration date of the existing credential;

obtain, by the first process automation tool and from an output of the API call, the updated credential provided by the external credential manager;

access, by the first process automation tool, the existing credential stored in the internal credential storage system;

replace, by the first process automation tool, the existing credential stored in the internal credential storage system with the updated credential;

subsequent to the first process automation tool replacing the existing credential stored in the internal credential storage system with the updated credential, access, by a second process automation tool, the internal credential storage system to obtain the updated credential, wherein the second process automation tool is a robotic process automation tool configured to perform an automated process involving access to a protected computing resource; and perform, by the second process automation tool, an authentication process to access the protected computing resource as part of performing the automated process, wherein performing the automated process further comprises mimicking a human-computer interaction involving the protected computing resource.

9. The system of claim 8, wherein the API call comprises a non-user identifier identifying the second process automation tool for which to obtain the updated credential from the external credential manager.

10. The system of claim 8, wherein the internal credential storage system is part of an automation platform used to build and deploy a plurality of process automation tools comprising the first process automation tool and the second process automation tool.

11. The system of claim 8, wherein the first process automation tool is another robotic process automation tool configured to automatically perform a credential rotation process by which a current credential associated with the second process automation tool is continually updated.

12. The system of claim 11, wherein the computer-executable instructions are further executable to cause the one or more processors to:

receive, by the robotic process automation tool, a non-user identifier as an input parameter;

locate, by the robotic process automation tool and using the non-user identifier, the existing credential in the internal credential storage system; and subsequent to locating the existing credential, replace, by the robotic process automation tool, the existing credential with the updated credential.

13. The system of claim 8, wherein the automated process comprises a predefined process having a series of tasks, and wherein performing at least one task of the series of tasks comprises handling data between the protected computing resource and at least one additional computing resource.

14. The system of claim 8, wherein the computer-executable instructions are further executable to cause the one or more processors to:

prior to the first process automation tool replacing the existing credential stored in the internal credential storage system with the updated credential, pause an operation of another process automation tool configured to use the existing credential to perform one or more tasks; and subsequent to the first process automation tool replacing the existing credential stored in the internal credential storage system with the updated credential, resume the operation of the other process automation tool.

15. A non-transitory computer-readable storage medium storing computer-executable instructions that, when executed with one or more processors of a computing device, causes the computing device to:

request, by a first process automation tool using an application programming interface (API) call and from an external credential manager, an updated credential to replace an existing credential stored in an internal credential storage system, wherein the first process automation tool comprises a scheduling parameter to automatically initiate the first process automation tool, wherein the scheduling parameter is defined based on a trigger condition corresponding to an expiration date of the existing credential;

obtain, by the first process automation tool and from an output of the API call, the updated credential provided by the external credential manager;

access, by the first process automation tool, the existing credential stored in the internal credential storage system;

replace, by the first process automation tool, the existing credential stored in the internal credential storage system with the updated credential;

subsequent to the first process automation tool replacing the existing credential stored in the internal credential storage system with the updated credential, access, by a second process automation tool, the internal credential storage system to obtain the updated credential, wherein the second process automation tool is a robotic process automation tool configured to perform an automated process involving access to a protected computing resource; and perform, by the second process automation tool, an authentication process to access the protected computing resource as part of performing the automated process, wherein performing the automated process further comprises mimicking a human-computer interaction involving the protected computing resource.

16. The non-transitory computer-readable storage medium of claim 15, wherein the API call comprises a non-user identifier identifying the second process automation tool for which to obtain the updated credential from the external credential manager.

17. The non-transitory computer-readable storage medium of claim 15, wherein the internal credential storage system is part of an automation platform used to build and deploy a plurality of process automation tools comprising the first process automation tool and the second process automation tool.

18. The non-transitory computer-readable storage medium of claim 15, wherein the first process automation tool is another robotic process automation tool configured to automatically perform a credential rotation process by which a current credential associated with the second process automation tool is continually updated.

19. The non-transitory computer-readable storage medium of claim 18, wherein the computer-executable instructions are further executable to cause the computing device to:

receive, by the robotic process automation tool, a non-user identifier as an input parameter;

locate, by the robotic process automation tool and using the non-user identifier, the existing credential in the internal credential storage system; and subsequent to locating the existing credential, replace, by the robotic process automation tool, the existing credential with the updated credential.

20. The non-transitory computer-readable storage medium of claim 15, wherein the computer-executable instructions are further executable to cause the computing device to:

prior to the first process automation tool replacing the existing credential stored in the internal credential storage system with the updated credential, pause an operation of another process automation tool configured to use the existing credential to perform one or more tasks; and subsequent to the first process automation tool replacing the existing credential stored in the internal credential storage system with the updated credential, resume the operation of the other process automation tool.

* * * * *